April 19, 1927.
M. EVANS
1,625,302
CULTIVATOR
Filed Aug. 30, 1926
2 Sheets-Sheet 2
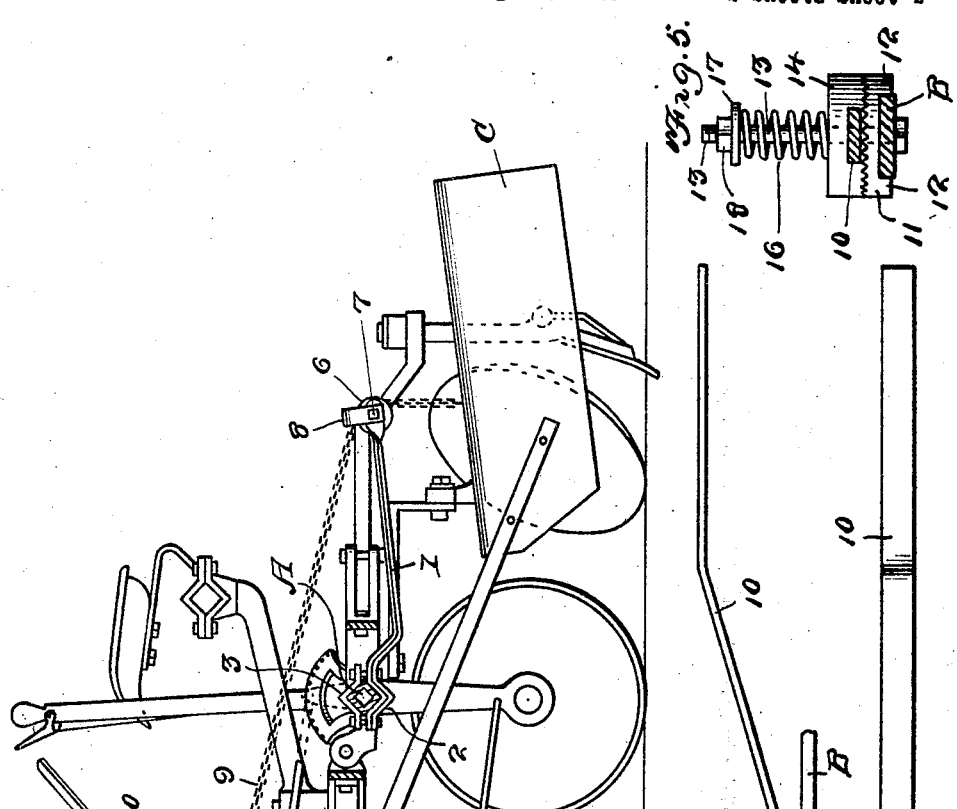

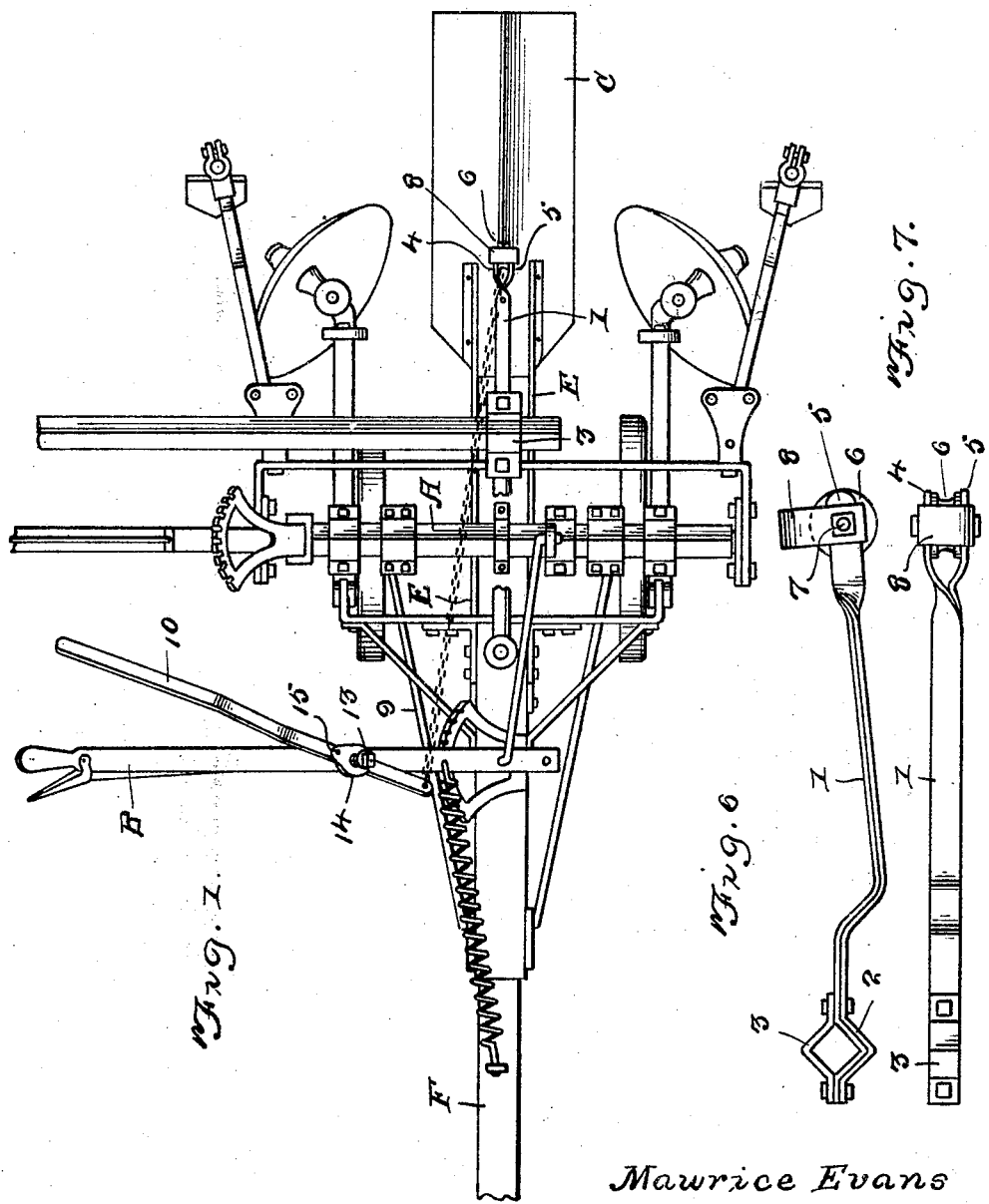

Patented Apr. 19, 1927.

1,625,302

UNITED STATES PATENT OFFICE.

MAURICE EVANS, OF BARNSTON, NEBRASKA.

CULTIVATOR.

Application filed August 30, 1926. Serial No. 132,555.

This invention relates to attachments for cultivators and its primary object is to provide a manual control means for the fenders of the cultivator, whereby the height of said fenders may be varied as desired and in accordance with the crop cultivated, or the fenders may be raised to inoperative position by said means, and said means can be actuated with very little effort on the part of the operator.

A further object is to provide an attachment for cultivators and the like which can be associated with any type cultivator with none or slight change thereto, and said attachment can be operated from the seat of the cultivator to adequately and expeditiously adjust the fenders of said cultivator at any desired height.

Another object of the invention is to provide an attachment for adjusting fenders of cultivators, that is strong and durable, easy to attach to the cultivator, simple to operate, and can be operated in unison with the control lever for the cultivator blades.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:

Figure 1 is a top plan view of a cultivator with the attachment which forms the subject matter of the present invention applied thereto.

Figure 2 is a sectional view taken vertically through the cultivator.

Figure 3 is an edge elevation of the control lever for the attachment and showing the same secured to the control lever for the blades of the cultivator.

Figure 4 is a front view of Figure 3.

Figure 5 is a sectional view taken on line 5—5 of Figure 3.

Figure 6 is an edge elevation of the supporting arm which forms a part of the invention.

Figure 7 is a top plan view of the supporting arm.

Referring to the drawings in detail the letter A indicates the main cross frame of the cultivator as shown, and B the hand lever for rotating the cross frame, for raising and lowering the cultivator disks and blades. The fender C is of the usual cross-sectional V-shape construction and has secured thereto one of the ends of connecting bars E, while the opposite ends of said bars are pivotally associated with the tongue F of the cultivator.

The attachment which forms the subject matter of the present invention is shown applied to the cultivator in Figures 1 and 2 and includes a supporting arm 1 formed from a pair of superposed elongated strips with one of their ends thereof arranged in substantially V-shaped configuration as at 2, and a similar shaped plate 3 is secured in opposed relation thereto so as to provide a clamp for fixing the supporting arm to the main cross frame as clearly shown in Figure 2 of the drawings. The strips are bent downwardly and rearwardly from their secured ends and thence incline upwardly to terminate in spaced relation to provide apertured ears 4 and 5 between which is journaled a grooved pulley 6 having its journal pin 7 secured in the apertures of the ears by a nut as clearly shown in Figures 6 and 7 of the drawings. A substantially U-shaped guard 8 is secured to the ends of the pin 7 and overlie the pulley 6 as best shown in Figure 6.

The means for raising and lowering the fender C includes a chain 9 which has one end secured to the fender and is thence passed over the grooved pulley 6, while its opposite end is secured to the control lever 10 which is associated with the hand lever B by an adjusting means which includes a disk member 11 formed with spaced lugs 12 arranged upon opposite sides of the lever B, and an opening is centrally arranged in the disk member 11 for receiving a bolt 13 which passes through said lever B and also a disk member 14 having an ear 15 formed thereon for securing said disk member 14 to the lever 10 as suggested in Figures 1 and 3 of the drawings. The disk member 14 is also provided with a slot to accommodate the lever 10. The confronting faces of the said disk members 11 and 14 are formed with cooperating teeth and a coil spring 16 surrounds the bolt 13 with its end convolutions engaging a washer 17 and disk member 14 respectively, to hold the teeth of the disk members in cooperating engagement as will be readily apparent. A nut 18 is threadedly secured to the bolt 13 and engages the washer 17 so that the tension of the spring 16 may be varied.

From the above description and disclosure in the drawings, it will be apparent that the fender C can be readily controlled from the driver's seat of the cultivator through the instrumentality of the control lever 10 which may be moved on its pivot, namely: the bolt 13 for raising and lowering the fender, by the connection of the chain 9 therewith, and the association of the teeth of the respective disk members by the pressure of the spring 13, will retain the lever 10 and the fender C in its adjusted position as will be readily apparent. By having the lever 10 secured to the lever B, it will be obvious that the fender C can also be adjusted in unison with the adjustment of the cultivating disks and blades of the cultivator, and said levers are arranged in convenient reach of the operator whereby all the operation including the adjustment of the fender C can be adequately and expeditiously made from the seat of the cultivator.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:

1. An attachment for cultivators comprising a supporting arm having one of its ends secured to the frame of the cultivator, a pulley journaled in the opposite end thereof, a control lever secured to one of the control lever of the cultivator and mounted for adjustment thereon, a flexible element trained over said pulley and having one end secured to a fender of the cultivator, while the opposite end is secured to the control lever first mentioned.

2. The combination with a cultivator including a control lever for the cultivating disks and blades, and also a fender associated with said disks and blades, of a supporting arm having one end secured to the main cross frame of the cultivator and thence extending rearwardly therefrom, a grooved pulley secured to the free end of said supporting arm, a flexible element trained over said pulley and having one end secured to the fender, a guard also secured to the last mentioned end of said supporting arm and overlying the pulley, a control lever receiving the opposite end of said flexible element, means for associating the last mentioned control lever with the control lever first mentioned and said means includes cooperating disk members having teeth arranged on their confronting faces, resilient means for retaining said teeth in cooperative association, whereby said second mentioned control lever may be retained in any adjusted position for adjusting the height of the fender accordingly.

3. An attachment for cultivators comprising a supporting arm, means for clamping one end of said supporting arm to the main frame of a cultivator, spaced parallel ears formed on the opposite end of said supportings arm, a pulley journaled between said ears, a flexible element trained over said pulley and having one end secured to the fender of the cultivator, a control lever having secured thereto the opposite end of said flexible element, and said control lever being adjustably associated with the control lever of the disks and blades of the cultivator whereby the fender may be moved in unison with said disks and blades.

4. In a means for adjusting a fender for a cultivator, a control lever pivotally associated with the control lever of the disks and blades of the cultivator, a pair of cooperating disk members included in the means, a bolt forming the pivot means for the control lever and passing through the disk members, teeth formed on the confronting faces of said disk members, a coil spring surrounding said bolt for holding said teeth in cooperative engagement and the lever first mentioned in adjusted position, and a flexible element trained over the grooved pulley and having its opposite ends secured to the fender and first mentioned control lever respectively.

In testimony whereof I affix my signature.

MAURICE EVANS.